APPARATUS FOR RECORDING MOVEMENT

Filed Jan. 25, 1950 2 SHEETS—SHEET 1

Inventor
Robert J. Hill
by Malcolm W. Fraser
attorney

May 27, 1952 R. J. HILL 2,598,541

APPARATUS FOR RECORDING MOVEMENT

Filed Jan. 25, 1950 2 SHEETS—SHEET 2

Inventor
Robert J. Hill
by Malcolm W. Fraser
attorney

Patented May 27, 1952

2,598,541

UNITED STATES PATENT OFFICE 2,598,541

APPARATUS FOR RECORDING MOVEMENT

Robert John Hill, Worcester Park, England

Application January 25, 1950, Serial No. 140,430
In Great Britain January 28, 1949

6 Claims. (Cl. 346—45)

The present invention relates to improved apparatus for recording movement.

The apparatus is primarily designed for use on vehicles for recording the times during which the vehicle is respectively travelling, stationary with the engine running and stationary with the engine switched off. However, it is not restricted to such use and can be employed to record movement caused by variations in electric current or sound, or, in fact, any variable capable of moving a stylus.

Known apparatus for providing a record of the use of a vehicle comprises clock mechanism serving to rotate at uniform speed a paper disc against which bears a stylus carried by a pendulum. The clock mechanism may be such, for example, that the paper disc makes one complete revolution in twenty-four hours, in which case the outer edge or rim of the disc is marked with the twenty-four hours and any desired subdivisions. The record is provided by virtue of the fact that when the vehicle is stationary and the engine switched off the stylus makes a clean, thin circular mark on the disc as the latter rotates against the stylus, but when the engine is started up the pendulum vibrates a little so that a thicker mark is made by the stylus, whilst when the vehicle is travelling the pendulum vibrates with greater amplitude still and thus provides the thickest mark of all on the disc. There is thus provided on the disc, for the whole twenty-four hours, a record of the three states referred to.

If it be desired to provide a record for more than one day, one of two alternatives has been adopted hitherto. Either the disc may be subdivided into more than twenty-four hours, in which case a very close scale is produced, or the support for the pendulum has been moved radially, and synchronously with the rotation of the disc, so as to produce a spiral record on the disc. The latter expedient provides a record which is relatively open along the length of the record but adjacent revolutions of the spiral are undesirably close.

It is an object of the present invention to provide a record of this kind but in which the records of consecutive days are produced as parallel straight lines across a rectangular record chart.

Other objects and advantages of the invention will become clear from the following description of a preferred embodiment.

Figure 1:
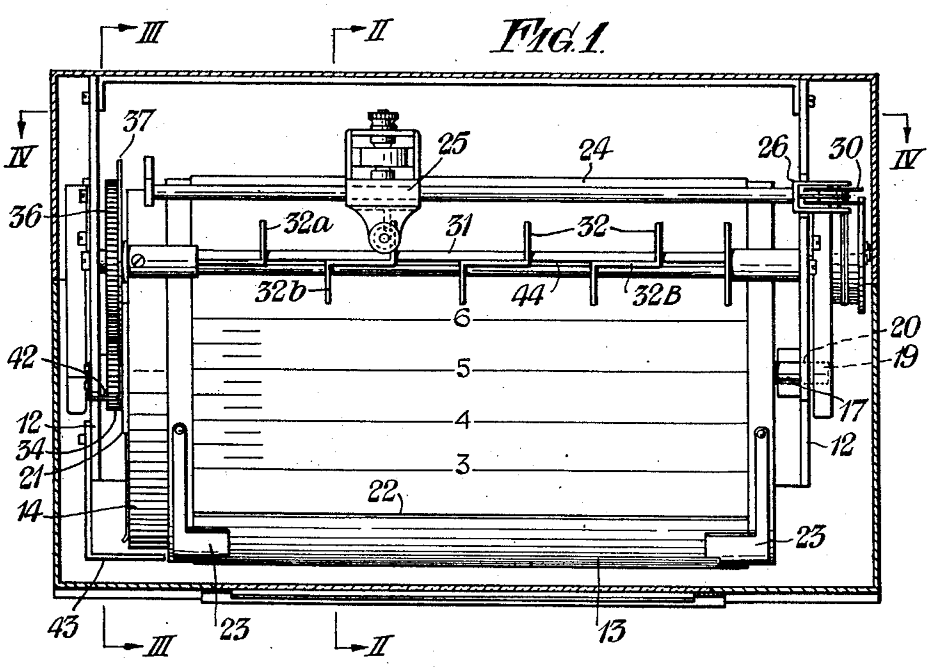
Figure 2:
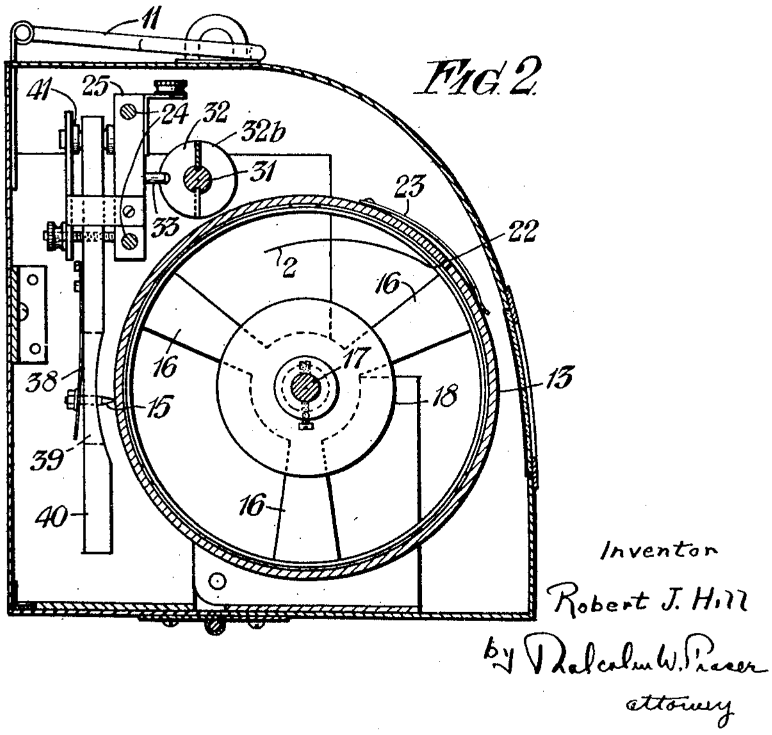
Figure 3:
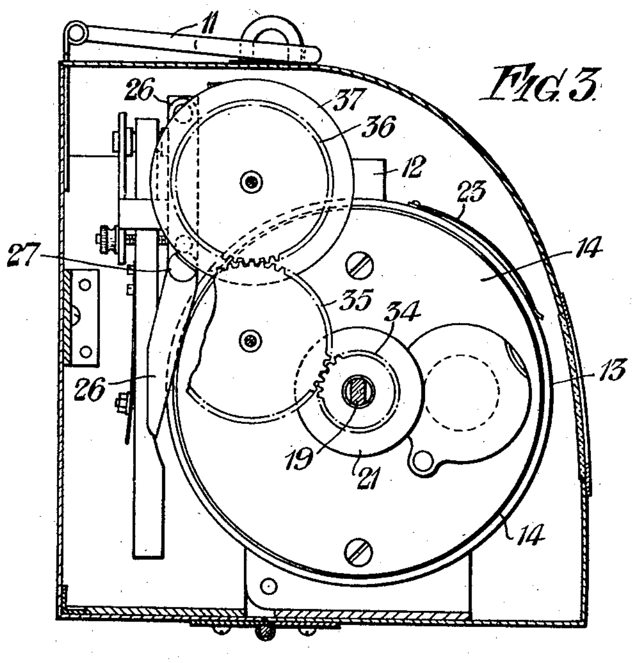
Figure 4:
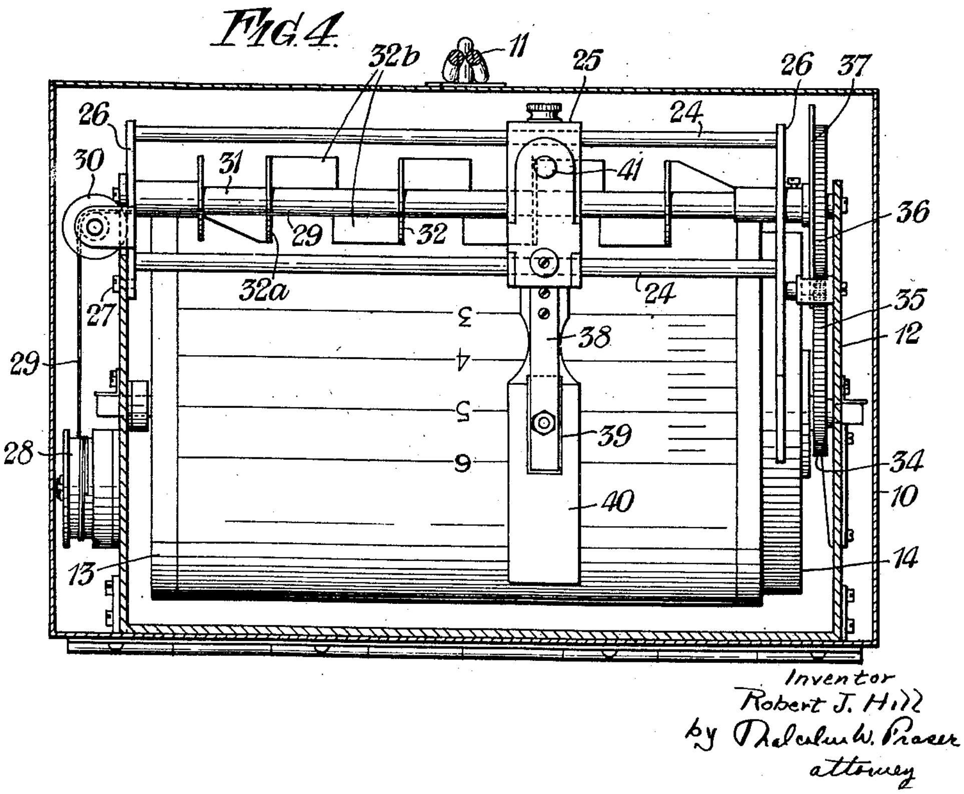

Figure 1 is a plan view of a movement recorder, part of an outer cover thereof being removed, and Figures 2, 3 and 4 are respectively sections on the lines II—II, III—III and IV—IV of Figure 1.

In the illustrated embodiment, a movement recorder is contained in a prism shaped metal box or cover 10 which may be held closed by a hasp 11 and sealed in any convenient manner as by a padlock (not shown). Mounted in a frame 12 inside the box 10, is a horizontal cylinder or drum 13 which is rotated by a clock mechanism 14, and a suitable record sheet, on which a path can be described by a stylus 15, is wrapped around the curved surface of the cylinder.

The cylinder 13, which may if desired be covered with rubber, is open at both ends. A central, axially bored bush (not shown) is carried at one end by a web 16 and the clock mechanism 14 is a tight spring fit in the other end. The clock mechanism is mounted on a central spindle 17 which, when the cylinder is removed from the frame, can be rotated by a knurled wheel 18 to wind the clock spring. Both ends of this spindle project out of the cylinder and terminate in flats 19 engaging in vertical slots 20 in the frame 12. Thus, the spindle 17 is held against rotation and the cylinder 13 caused to rotate about it at a speed of one revolution every twenty-four hours. The cylinder contains a continuous roll 21 of rectangular waxed record sheets. One end of the roll emerges from a longitudinal slot 22 in the curved surface of the cylinder around which it is wrapped, the free end of the roll being secured by spring clips 23 or other suitable means. When a sheet has been used, the roll is advanced through the slot, the next sheet wrapped round the cylinder and the used sheet torn off.

Spaced from the cylinder 13, is a pair of parallel, horizontal guide rods 24 on which is slidably mounted a bracket 25 supporting the stylus 15, the rods 24 being secured in end pieces 26 carried on horizontal pivots 27. The bracket 25 is positively biased to move along its guides by a drum 28 which is spring-urged to rotate in one direction, and which is mounted on the frame and acts on the bracket through a cord 29 passing over a pulley 30.

On the side of the guide rods 24 remote from the cylinder 13, and parallel therewith, is a timing rod 31 carrying equally spaced, semi-circular flanges 32, connected by plates 32A, serving as stops for a timing finger 33 of the bracket 25. Adjacent flanges 32 are connected by plates such as 32B. This timing rod is rotated at half the speed of the cylinder 13 from a toothed wheel 34 thereof acting through toothed wheels 35, 36 to the latter of which is secured a timing wheel 37 graduated with two groups of twenty-four hours. Adjacent flanges, of which there are seven, i. e. one for each day of the week, are displaced 180° with respect to each other.

The timing finger 33 bears in turn against each of the flanges 32 commencing with flange *32a*. When the flange against which it is bearing arrives at a predetermined angular position, i. e. after rotation through 180° since the flange is semi-circular, the finger is released therefrom so that the bracket 25, and with it the stylus 15, is drawn along the guide rods 24 by the cord 29 until the finger abuts against the next flange adjacent the base thereof. As the timing rod rotates once in forty-eight hours, the bracket is displaced at intervals of twenty-four hours until, at the end of the seventh day, it has completely traversed the cylinder 13 when it is necessary to reset the apparatus. This can be conveniently effected by releasing the cylinder 13 from the frame 12 when the guide rods 24 can be rocked about their pivots 27 to move the timing finger 33 out of engagement with the flanges 32 and permit retraction of the bracket 25.

The vibratory stylus 15 is mounted on a strip 38 of spring steel urging it against the curved surface of the cylinder 13 and extending across a slot 39 of a pendulum 40 pivotally mounted at 41 on the bracket 25.

The device operates as follows:

The box 10 is fixed rigidly on a vehicle and at any desired moment, e. g. at midnight between Sunday and Monday, the timing finger 33 is set to bear against the first flange 32*a* adjacent the base thereof, the correct angular positions of the cylinder and timing rod being obtained by registering the appropriate graduations on the timing wheel 37 and the cylinder 13 with fixed indicators 42 and 43 respectively. Rotation of the timing rod and the cylinder then commences.

When the vehicle is stationary the stylus remains in a fixed position and makes a thin record on the record-sheet. If at any time during the first twenty-four hours the vehicle engine is started the stylus vibrates slightly and thus makes a slightly thicker mark on the record sheet. At all times that the vehicle is in motion the stylus vibrates with larger amplitude and thus makes a wide line on the record-sheet. In this way there is provided on the record-sheet a record of the three states in which the vehicle may be during the first twenty-four hours. It is to be noted that this record lies in a circular path on the record-sheet which, when the sheet is unwrapped from the cylinder, appears as a straight line across the sheet.

At the end of twenty-four hours the timing-rod 31 has completed one half revolution so that the timing-finger 33 is released from the flange 32*a* and urged to the next one 32*b* which is located at about half an inch from the first and at 180° angular displacement with respect thereto. The stylus thus moves quickly a distance of half an inch across the record-sheet and thereafter produces a similar sort of record on the sheet during the next twenty-four hours. The second path is thus also circular, is parallel with the first and is displaced therefrom by half-an-inch.

At the end of the second twenty-four hours the timing-rod has completed another half revolution so that the timing-finger then moves against the third flange to allow the stylus to give a record of the third twenty-four hours.

In this way there is produced a record-sheet which, when unwrapped from the cylinder 13, consists of seven horizontal lines running across the sheet at intervals of half an inch one below the other, the lines being of varying thickness according to the performance of the vehicle.

The stylus makes its record by removing wax from the record-sheet and revealing a coloured surface under the wax.

It will be appreciated that the device may be arranged to operate for a period of twelve hours instead of twenty-four and for any number of days or half-days that may be required.

A convenient way of making the timing-rod 31 is to form a pair of parallel grooves 44 along a cylindrical rod and to secure the flanges 32 therein by friction. A pair of flanges may be stamped from a single piece of sheet metal which is in the shape of two semi-circles joined by a rectangular area. A dumb-bell shaped slot is cut out of the centre of such a blank after which it is sheared through along the radius of one of the said semi-circles; the blank is then folded in opposite directions along the parallel diameters of the two semicircles after which it is slipped over the end of the timing-rod and engaged in the slots to form two semi-circular flanges 32 and two guide plates 32B, the flanges being displaced 180° with respect to each other.

If desired the cylinder may be mounted for rotation about a vertical axis, in which case the timing rod and guide rods are also vertical, the vibratory stylus then travelling down a guide rod by gravity.

I claim:

1. A movement recorder comprising a rotatable record cylinder, a rotatable timing rod parallel with the axis of the cylinder, stops on the timing rod which are both axially and angularly spaced on the rod, means for rotating the cylinder and the timing rod in synchronism, a guide rod parallel with the axis of the cylinder, a bracket slidably mounted on the guide rod and bearing against one of said stops, and a stylus suspended on the bracket so as to bear against the record cylinder.

2. A movement recorder as claimed in claim 1 and including biassing means for urging the stylus along the guide rod carrying it.

3. A movement recorder as claimed in claim 1 wherein the stops of the timing rod are in the form of a plurality of semi-circular flanges spaced equidistantly along the rod and adjacent ones of which are angularly displaced by 180° with respect to each other.

4. A movement recorder as claimed in claim 1 wherein the stops of the timing rod are in the form of a plurality of semi-circular flanges secured frictionally in longitudinal grooves formed in the timing rod and adjacent ones of which are spaced angularly by 180° with respect to each other.

5. A movement recorder as claimed in claim 1 and including spring means for urging the vibratory stylus towards the curved surface of the cylinder.

6. A movement recorder as claimed in claim 1 wherein the cylinder is disposed for rotation about a horizontal axis and spring means are provided for urging the stylus along its guide rod.

ROBERT JOHN HILL.

REFERENCES CITED

The following references are of record in the file of this patent:

UNITED STATES PATENTS

| Number | Name | Date |
|---|---|---|
| 2,000,046 | Stevens | May 7, 1935 |
| 2,027,945 | Widmer | Jan. 14, 1936 |
| 2,125,345 | Hunt | Aug. 2, 1938 |
| 2,366,383 | Cameron | Jan. 2, 1945 |
| 2,394,435 | Finch | Feb. 5, 1946 |